United States Patent [19]

Lindberg

[11] Patent Number: 4,770,583

[45] Date of Patent: Sep. 13, 1988

[54] FASTENING MEANS FOR FIXING OF A SCREW OR THE LIKE IN A HOLE PREFERABLY MADE IN A PLASTER BOARD

[75] Inventor: Sören Lindberg, Gävle, Sweden

[73] Assignee: Stig Danielsson, Sweden

[21] Appl. No.: 3,559

[22] Filed: Jan. 15, 1987

[51] Int. Cl.⁴ .............................................. F16B 21/00
[52] U.S. Cl. ...................................... 411/340; 411/44; 411/55; 411/913; 411/60
[58] Field of Search .................. 411/340, 344, 345, 55, 411/45, 44, 913, 32, 60

[56] References Cited

U.S. PATENT DOCUMENTS

| | | | |
|---|---|---|---|
| 2,435,876 | 2/1948 | Swart | 411/55 |
| 2,805,597 | 9/1957 | O'Shaughnessy, Jr. | 411/60 |
| 3,421,404 | 1/1969 | Jacobs | 411/55 |
| 4,040,463 | 8/1977 | Petrus | 411/182 |
| 4,415,299 | 11/1983 | Smith et al. | 411/340 |
| 4,530,630 | 7/1985 | Brown | 411/340 |

FOREIGN PATENT DOCUMENTS

| | | | |
|---|---|---|---|
| 498195 | 9/1954 | Italy | 411/55 |
| 300088 | 11/1928 | United Kingdom | 411/55 |
| 553124 | 5/1943 | United Kingdom | 411/55 |
| 648424 | 1/1951 | United Kingdom | 411/55 |

Primary Examiner—Gary L. Smith
Assistant Examiner—Curtis B. Brueske
Attorney, Agent, or Firm—Ostrolenk, Faber, Gerb & Soffen

[57] ABSTRACT

Fastening device for fixing a screw or the like in a hole or opening in plaster board, or the like. It comprises a sleeve with a flange placed at one side of the board and a nut fixable against the back of the plaster board. A mounting screw is passed through the sleeve and the nut. The sleeve has an inner cone and the nut has a corresponding cone which extends into the inner cone. As the nut and sleeve are drawn together, the cones engage and spread the sleeve. The sleeve is provided with at least one pair of slits defining longitudinal tongues which are spread. A screw inserted through the sleeve into the nut pulls the cones together. The nut itself is provided with wings which may be bent out against the back surface of the board. The tightening of the nut on the screw thereby results in anchoring the nut against the back surface of the board and pulls the flange of the sleeve against the front surface and spreads the slit sleeve.

6 Claims, 1 Drawing Sheet

FASTENING MEANS FOR FIXING OF A SCREW OR THE LIKE IN A HOLE PREFERABLY MADE IN A PLASTER BOARD

BACKGROUND OF THE INVENTION

The present invention relates to a fastening means for fixing of a screw or the like in a hole preferably made in a plaster board. Said fastening means comprises a flange provided sleeve and a nut body fixable against the back of the plaster board by aid of anchoring means, a mounting screw extending through said two parts and arranged to fasten the parts close to and in the hole.

Several types of fastening means exist on the market today which are intended to be fixed in holes made in plaster boards and all said fastening means have the drawback that they eat through or destroy the plaster board and that in this connection damage occurs in the form of cavities in the board which are very difficult to repair.

SUMMARY OF THE INVENTION

One object of the present invention is to provide a fastening means of the type described above in which the drawbacks existing in said known structures have been totally eliminated. On essential distinction of the invention is that the flange provided sleeve intended to be inserted into the hole and having an outer diameter mainly corresponding the hole diameter is slit up in a direction towards its free end of from its flange and is provided with an inner cone. This inner cone is intended to cooperate with a corresponding conically formed part provided on the nut body and protruding in a direction towards a holeformation of the sleeve. The anchoring means of the nut body consist of at least three resilient support wings, which, after the insertion of the fastening means into the hole, spring out to contact the back of the plaster board when the conical formed part is placed in the inner cone of the sleeve to press the sleeve wall to a tight contact against the mantel surface of the hole in order to fasten the fastening means in the hole.

As a result of the invention there is now obtained a fastening means serving its purpose exellently, but being simple and cheap to manufacture at the same time. By the invention a fastening means has been obtained which is very careful or gentle to the plaster board and to the area of the board in which it is fixed in the hole in question so that the hole damages which occured when using the previously known fastening means now no longer happen.

BRIEF DESCRIPTION OF THE DRAWINGS

The invention will now be described in detail with the aid of an embodiment selected as an example and depicted on the appended drawings, wherein.

DESCRIPTION OF PREFERRED EMBODIMENT

Figure 1:
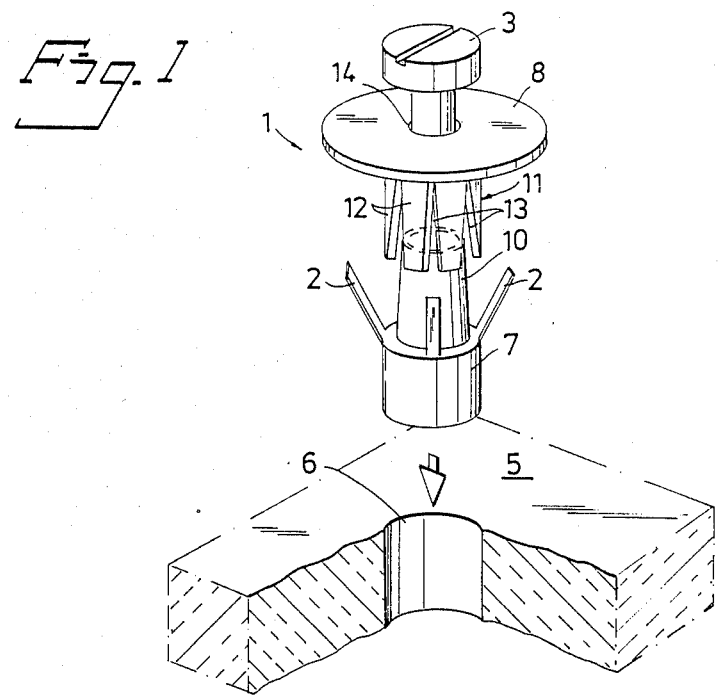
FIG. 1 is a schematic perspective view of a fastening means according to the present invention before mounting in a hole made in a plaster board.

As will be seen from FIG. 1 the fastening means of the present invention comprises a sleeve 1 having a flange 8, a mounting screw 3 and a nut body 7. The nut body 7 is provided with four supporting wings 2 which are resilient relative to the nut body 7. The flanged sleeve 1 is intended to be inserted in a hole 6 made in a plaster board 5 to each distance that the flange 8 contacts the front surface of the board 5. The outer diameter of the sleeve 1 mainly corresponds to the outer diameter of the hole 6 so that as little clearance as possible exists between the outer surface of sleeve wall 11 and the mantle or surrounding surface of the hole 6. The sleeve wall 11 has a length which mainly corresponds to the thickness of the plaster board 5 and is preferably cylindrical. Further the sleeve 1 is slit up in its longitudinal direction by at least two slits 13 to provide tongue parts 12. The sleeve also has an inner cone 9 for cooperation with a correspondingly formed cone 10 on the nut body 7. The mounting screw 3 extends through a hole 14 in the flange 8 of the sleeve 1. Hole 14 has a smaller diameter than the diameter of the inner cone 9 of the sleeve 1. Screw 3 extends into and ends in the nut body 7. The screw either can be self-threading or it can cooperate with a thread provided in the nut body 7.

Figure 2:
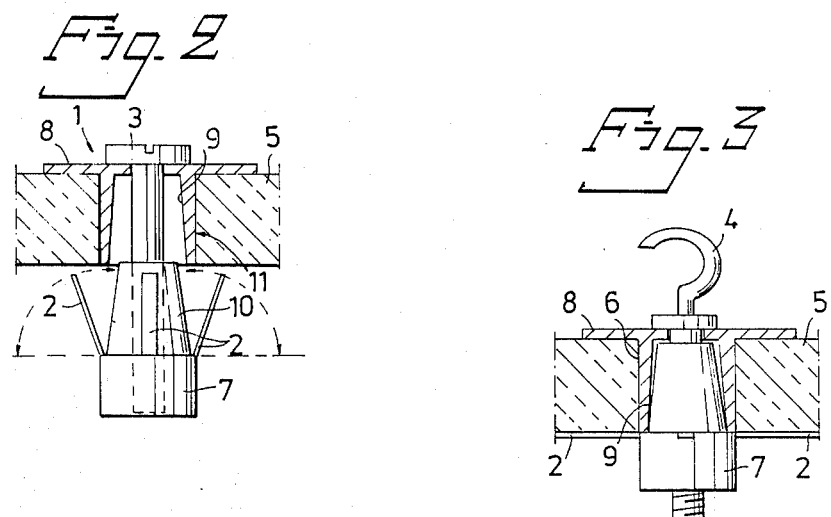
FIG. 2 is a schematic cross section of the fastening means illustrated in FIG. 1 before its final fixing in the plaster board.
Figure 3:
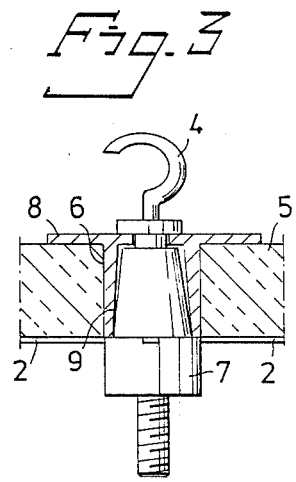
FIG. 3 is a schematic cross section through the fastening means after it has been fixed in the hole made in the plaster board and where the mounting screw has been replaced by a hook screw and FIG. 4 is an end view of the fastening means according to the invention seen in a direction towards the back of the plaster board showing the supportng wings of the fastening means closely engaging the back of the plaster board.

Before mounting of the fastening means, as can be seen from FIG. 1, the resilient supporting wings 2 constitute an angle of 30°-45° to the central axis of the mounting screw 3 as seen in a direction towards the flange 8 of the sleeve 1. The length of the mounting screw 3 mainly corresponds to the total length of the nut body 7 and the sleeve 1. Thus (see FIG. 2), the resilient supporting wings 2 after the insertion of the fastening means into the the hole 6 to the extent that the flange 8 of the sleeve 1 contacts the front surface of the plaster board 5, again can move outwards from each other or open as an umbrella and by aid of the mounting screw 3 can be brought into contact with the the back of the plaster board 5 at the same time as the two conical parts 9 and 10 are cooperating so that the tonge parts 12 of the sleeve 1 are pressed to a tight contact with the mantle surface of the hole 6. By this a firm and a gentle fixing of the fastening means in the hole 6 of the plaster board 5 is obtained. This can more readily be seen from FIG. 3.

After fixing of the fastening means by the mounting screw 3 the latter can be screwed out and be replaced by a hook screw 4, which can serve as a mounting hook.

By manufacturing both the sleeve 1 and the nut body 7 of a plastic material the mounting screw 3 e.g. can be self-threaded in the nut body 7. The supporting wings 2 of the nut body 7 have a length which is a bit shorter than the conically formed part 10 of the nut body 7 and which permits the nut body 7 provided with a mounting screw 3 to be very easily inserted into the inner cone 9 of the sleeve 1, in order to function as a finished or ready mounting- and delivery package. The length of the cone of the part 10 is less than the inner cone 9 with which it cooperates in the sleeve 1.

Figure 4:
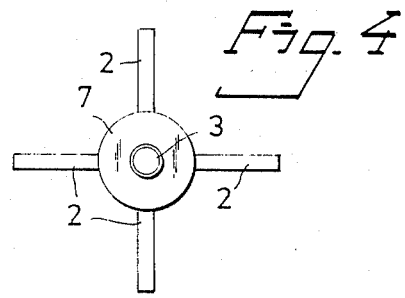

By this means, the sleeve wall 11 is pressed-fixed firmer in the prebored hole 6 in the plaster board 5 to the extent the part 10 is urged into the inner cone 9 of the sleeve 1. The supporting wings 2 can both spring outwards to contact the back of the plaster board 5 and when inserting the fastening means into the hole 6, spring inwards towards the conical part 10 of the nut body 7, so that they lie inside the outer diameter of the sleeve wall 11. When the wings 2 spring outwards to contact the back of the plaster board 5, (see FIG. 4), the part 10 of the nut body 7 locks at the same time by aid of the inner cone 9 of the sleeve 1, the sleeve 1 itself in the hole 6, so that the fastening means is fixed in the plaster board 5 without any cutting edges or the like damage the plaster board 5. Tightening of the screw drives the wings outward to an angle of 90°.

The mounting of the fastening means according to the present invention is performed in the following way:

A hole 6 is first bored in the plaster board 5. Hole 6 has a diameter as big as the outer diameter of the sleeve 1 of the fastening means. Then the fastening means having the mounting screw 3 is taken from the delivery package (see FIG. 1), and is inserted into the hole 6 so that the wings 2 first are bent towards each other and thereafter when leaving the edge of the hole 6 are bent apart into contact with the back of the board 5 during screwing of the mounting screw 3 in a direction for fixing the fastening means in the hole 6.

I claim:

1. Fastening means for securing a screw in a hole in plaster board, or the like, said fastening means comprising:
    a sleeve insertable into and through the hole; said sleeve having an outer diameter generally corresponding to the hole diameter; a flange on said sleeve for engaging the front of the plaster board, or the like; said sleeve having a length from said flange corresponding to the thickness of the plaster board, or the like; said sleeve having an inner cone within it over said length; said sleeve being slit longitudinally by at least two slits to form longitudinally extending tongues;
    a nut fixable against the back of the plaster board, or the like; a cone on said nut correspondingly shaped to said inner cone of said sleeve and insertable therein over the length of the inner cone;
    said nut having at least two resilient supporting wings attached to said nut beneath said nut cone; said wings being springable outwardly to form an angle of 90° to the axis of the screw to engage said wings along their entire lengths against the back of the plaster board, or the like;
    said mounting screw extending through said sleeve and said nut to draw said nut cone into said inner cone, and said screw in said inner cone of said sleeve driving the exterior of said sleeve into tight contact with the surface of the hole, wherein the nut abuts the sleeve and prevents further axial movement of the nut when the wings form said 90 degree angle whereby the combination of the force exerted on said inner cone and said supporting wings of said nut fix said fastening means in the hole.

2. Fastening means according to claim 1, wherein said supporting wings of said nut have a length which is less than said cone of said nut.

3. Fastening means according to claim 1, wherein said supporting wings both before and after the insertion of said fastening means into the hole are at an angle of 30°–45° to the axis of said screw seen in a direction towards the flange of said sleeve.

4. Fastening means according to claim 1, wherein the length of said screw corresponds to the total length of said nut and said sleeve.

5. Fastening means according to claim 1, wherein the outer diameter of said sleeve is at least the same as the outer diameter of said nut.

6. Fastening means according to claim 1, wherein said nut is comprised of a self-threaded material for cooperation with the thread of said screw screwed into said fastening means.

* * * * *